(12) United States Patent
Armstrong et al.

(10) Patent No.: US 10,773,875 B2
(45) Date of Patent: Sep. 15, 2020

(54) METHOD OF MAKING A PLASTIC AEROSOL CONTAINER ASSEMBLY

(71) Applicant: GRAHAM PACKAGING COMPANY, L.P., Lancaster, PA (US)

(72) Inventors: Ralph Armstrong, Weston, CT (US);
Thomas E. Nahill, Amherst, NH (US);
Keith J. Barker, Bedford, NH (US);
Brian A. Lynch, Merrimack, NH (US)

(73) Assignee: GRAHAM PACKAGING COMPANY, L.P., Lancaster, PA (US)

( * ) Notice: Subject to any disclaimer, the term of this patent is extended or adjusted under 35 U.S.C. 154(b) by 409 days.

(21) Appl. No.: 15/787,336

(22) Filed: Oct. 18, 2017

(65) Prior Publication Data

US 2018/0037399 A1    Feb. 8, 2018

Related U.S. Application Data

(63) Continuation of application No. 13/251,830, filed on Oct. 3, 2011, now abandoned.

(51) Int. Cl.
| | |
|---|---|
| *B65D 83/38* | (2006.01) |
| *B29C 49/06* | (2006.01) |
| *B65D 83/44* | (2006.01) |
| *B29K 67/00* | (2006.01) |

(52) U.S. Cl.
CPC .............. *B65D 83/38* (2013.01); *B29C 49/06* (2013.01); *B65D 83/44* (2013.01); *B29K 2067/003* (2013.01)

(58) Field of Classification Search
CPC ....................................................... B65D 83/38
See application file for complete search history.

(56) References Cited

U.S. PATENT DOCUMENTS

| | | |
|---|---|---|
| 3,161,330 A | 12/1964 | Sagarin et al. |
| 3,343,730 A | 9/1967 | Nier et al. |
| 3,392,861 A | 7/1968 | Dimmitt et al. |
| 4,297,306 A | 10/1981 | Yoshino et al. |
| 4,386,046 A | 5/1983 | Yoshino et al. |
| 4,497,758 A | 2/1985 | Clark |
| 4,628,669 A | 12/1986 | Herron et al. |
| 4,818,575 A | 4/1989 | Hirata et al. |
| 5,849,224 A | 12/1998 | Valyi |

(Continued)

FOREIGN PATENT DOCUMENTS

| | | |
|---|---|---|
| CN | 1162948 A | 10/1997 |
| CN | 1477030 A | 2/2004 |

(Continued)

OTHER PUBLICATIONS

U.S. Appl. No. 13/251,830, filed Oct. 3, 2011.

(Continued)

*Primary Examiner* — J C Jacyna
(74) *Attorney, Agent, or Firm* — Baker Botts L.L.P.

(57) ABSTRACT

A method of forming a plastic aerosol container, including, providing a preform having a finish portion, blow molding a plastic container from the preform, and reforming the finish portion so that an inner surface thereof has an undercut defined therein proximate an upper rim fo the finish portion. The undercut includes a substantially horizontal orientation and reforming the finish portion is performed after providing a preform.

11 Claims, 4 Drawing Sheets

(56) References Cited

U.S. PATENT DOCUMENTS

| | | | |
|---|---|---|---|
| 6,099,766 | A | 8/2000 | Aoki et al. |
| 6,173,907 | B1 | 1/2001 | Benoist |
| 6,390,326 | B1 | 5/2002 | Hung |
| 6,510,967 | B1 | 1/2003 | DeSimone |
| 7,028,866 | B2 | 4/2006 | Kunesh et al. |
| 7,033,656 | B2 | 4/2006 | Nahill et al. |
| 9,694,967 | B2 * | 7/2017 | Salameh ............... B65D 83/38 |
| 2002/0160136 | A1 | 10/2002 | Wong |
| 2003/0178432 | A1 * | 9/2003 | Meiland ............... B65D 83/38 |
| | | | 220/612 |
| 2004/0222244 | A1 | 11/2004 | Groeger |
| 2005/0155980 | A1 | 7/2005 | Neuhalfen |
| 2007/0145079 | A1 * | 6/2007 | Casamento ............ B65D 83/62 |
| | | | 222/386.5 |
| 2007/0245538 | A1 | 10/2007 | Salameh |
| 2007/0267383 | A1 | 11/2007 | McGeough et al. |
| 2007/0298139 | A1 | 12/2007 | Balboni et al. |
| 2008/0054524 | A1 | 3/2008 | Chisholm et al. |
| 2010/0288796 | A1 | 11/2010 | Gaudron |
| 2012/0103330 | A1 | 5/2012 | David et al. |
| 2012/0211457 | A1 | 8/2012 | Patel et al. |
| 2013/0037580 | A1 | 2/2013 | Armstrong et al. |

FOREIGN PATENT DOCUMENTS

| | | |
|---|---|---|
| CN | 101351391 A | 1/2009 |
| DE | 20114821 U1 | 12/2001 |
| DE | 10201850 A1 | 8/2002 |
| EP | 0426580 A1 | 5/1991 |
| FR | 2546485 A1 | 11/1984 |
| JP | 2002-12277 | 1/2002 |
| WO | WO 2008/125126 | 10/2008 |

OTHER PUBLICATIONS

U.S. Appl. No. 13/251,830, dated Mar. 9, 2018 Patent Board Decision.
U.S. Appl. No. 13/251,830, Dec. 19, 2016 Reply Brief Filed.
U.S. Appl. No. 13/251,830, Oct. 17, 2016 Examiner's Answer to Appeal Brief.
U.S. Appl. No. 13/251,830, Aug. 29, 2016 Appeal Brief Filed.
U.S. Appl. No. 13/251,830, Jun. 29, 2016 Notice of Appeal Filed.
U.S. Appl. No. 13/251,830, dated May 11, 2016 Advisory Action.
U.S. Appl. No. 13/251,830, dated May 2, 2016 Response after Final Office Action.
U.S. Appl. No. 13/251,830, dated Mar. 2, 2016 Final Office Action.
U.S. Appl. No. 13/251,830, dated Jan. 4, 2016 Response to Non-Final Office Action.
U.S. Appl. No. 13/251,830, dated Sep. 3, 2015 Non-Final Office Action.
U.S. Appl. No. 13/251,830, dated Jul. 14, 2015 Response to Non-Final Office Action.
U.S. Appl. No. 13/251,830, dated Apr. 14, 2015 Non-Final Office Action.
U.S. Appl. No. 13/251,830, Dec. 22, 2014 Appeal Brief Filed.
U.S. Appl. No. 13/251,830, Oct. 20, 2014 Notice of Appeal Filed.
U.S. Appl. No. 13/251,830, dated Oct. 1, 2014 Advisory Action.
U.S. Appl. No. 13/251,830, dated Sep. 22, 2014 Response after Final Office Action.
U.S. Appl. No. 13/251,830, dated Jul. 21, 2014 Final Office Action.
U.S. Appl. No. 13/251,830, dated Jun. 11, 2014 Response to Non-Final Office Action.
U.S. Appl. No. 13/251,830, dated Jan. 28, 2014 Non-Final Office Action.
U.S. Appl. No. 13/251,830, dated Dec. 23, 2013 Amendment and Request for Continued Examination (RCE).
U.S. Appl. No. 13/251,830, dated Dec. 6, 2013 Advisory Action.
U.S. Appl. No. 13/251,830, dated Nov. 27, 2013 Response after Final Office Action.
U.S. Appl. No. 13/251,830, dated Sep. 30, 2013 Final Office Action.
U.S. Appl. No. 13/251,830, dated Aug. 14, 2013 Response to Non-Final Office Action.
U.S. Appl. No. 13/251,830, dated May 15, 2013 Non-Final Office Action.
U.S. Appl. No. 13/251,830, dated May 1, 2013 Response to Restriction Requirement.
U.S. Appl. No. 13/251,830, dated Mar. 20, 2013 Restriction Requirement.
International Search Report dated Jan. 25, 2013 for corresponding PCT/US2012/058518 filed Oct. 3, 2012.

* cited by examiner

METHOD OF MAKING A PLASTIC AEROSOL CONTAINER ASSEMBLY

CROSS-REFERENCE TO RELATED APPLICATIONS

This application is a continuation of U.S. patent application Ser. No. 13/251,830, filed Oct. 3, 2011, the content of which is incorporated by reference herein in its entirety.

BACKGROUND OF THE INVENTION

1. Field of the Invention

This invention relates broadly to the field of containers that are adapted to hold highly pressurized contents, such as aerosol mixtures, and more particularly to a blow molded plastic aerosol container having a finish portion that is constructed and arranged to provide an optimal seal to an aerosol valve assembly.

2. Description of the Related Technology

Aerosol containers have conventionally been fabricated from metal, and are conventionally formed as a cylindrical tube having upper and lower end closures. The bottom end closure is typically shaped as a concave dome, and the upper end closure typically includes a manually actuatable valve for dispensing the pressurized aerosol contents of the container.

Metallic containers have certain inherent disadvantages, such as a tendency to rust over time and to scratch surfaces with which they may come into contact.

Efforts have been made in the past to develop plastic aerosol containers, but have encountered difficulties, mainly relating to controlling the deformation of the plastic material as a result of the significant internal pressurization that is necessary in an aerosol container. Aerosol containers commonly require internal pressures of the magnitude of 50-300 psi, which is significantly greater than pressures that are typically encountered in other packaging applications for which plastic material has been used, such as the packaging of carbonated beverages. Accordingly, design considerations for plastic aerosol containers are quite different than they are for lower pressure packaging applications such as plastic beverage containers.

One common type of plastic container is fabricated from a material such as polyethylene terephthalate (PET) and is manufactured from an injection molded preform having a threaded finish portion using the reheat stretch blow molding process. While such containers hold some promise for aerosol applications, they are susceptible to stress cracking in the finish portion while under pressurization. In addition, the finish portion of such containers has a tendency to deform when the container is pressurized, possibly resulting in a loss of sealing integrity between the container and the aerosol dispensing closure.

The preforms that are used in the reheat stretch blow molding process typically include a finish portion that remains substantially unchanged in shape as a result of the blow molding process. The finish portion includes the upper rim of the container that defines the container opening. Typically, the aerosol valve assembly that is required in plastic aerosol containers has been attached to the outer surface of the finish portion, which may be provided with external threading or one or more mounting flanges. In metal aerosol containers, it is considered preferable to mount the valve assembly to an inside surface of the upper portion of the container. An inside seal has inherent mechanical advantages over an outside seal, but those in the field have considered an inside seal to be impractical for plastic aerosol containers because of the difficulty of mounting a valve assembly to the inner surface of the finish portion of a blow molded plastic container. The inner surface of the finish portion in such a container tends to be smooth, with no features that would enable a valve assembly to gain the necessary purchase in order to prevent dislodgement.

A need exists for an improved blow molded plastic aerosol container assembly that provides a more effective mount and seal between the finish portion of the plastic container and an aerosol valve assembly.

SUMMARY OF THE INVENTION

Accordingly, it is an object of the invention to provide an improved blow molded plastic aerosol container assembly that achieves a more effective mount and seal between the finish portion of the plastic container and an aerosol valve assembly.

In order to achieve the above and other objects of the invention, a plastic aerosol container assembly according to a first aspect of the invention includes a plastic container having a main body portion defining an interior space and a finish portion that defines an opening. The finish portion has an inner surface that has an undercut defined therein. The container assembly further includes an aerosol valve assembly mounted to the plastic container that has a portion that engages the inner surface of the finish portion so as to be retained by the undercut.

A plastic aerosol container according to a second aspect of the invention includes a main body portion defining an interior space; and a finish portion that is unitary with the main body portion and has an inner surface that has an undercut defined therein.

A plastic aerosol container according to a third aspect of the invention includes a main body portion defining an interior space; and a finish portion that is unitary with the main body portion. The main body portion and the finish portion are fabricated from a material comprising polyethylene terephthalate. At least a portion of the finish portion is crystallized.

A method of forming a plastic aerosol container according to a fourth aspect of the invention includes steps of (a) providing a preform having a finish portion; (b) blow molding a plastic container from the preform; and (c) reforming the finish portion so that an inner surface thereof has an undercut defined therein, and wherein step (c) is performed at some point after step (a).

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
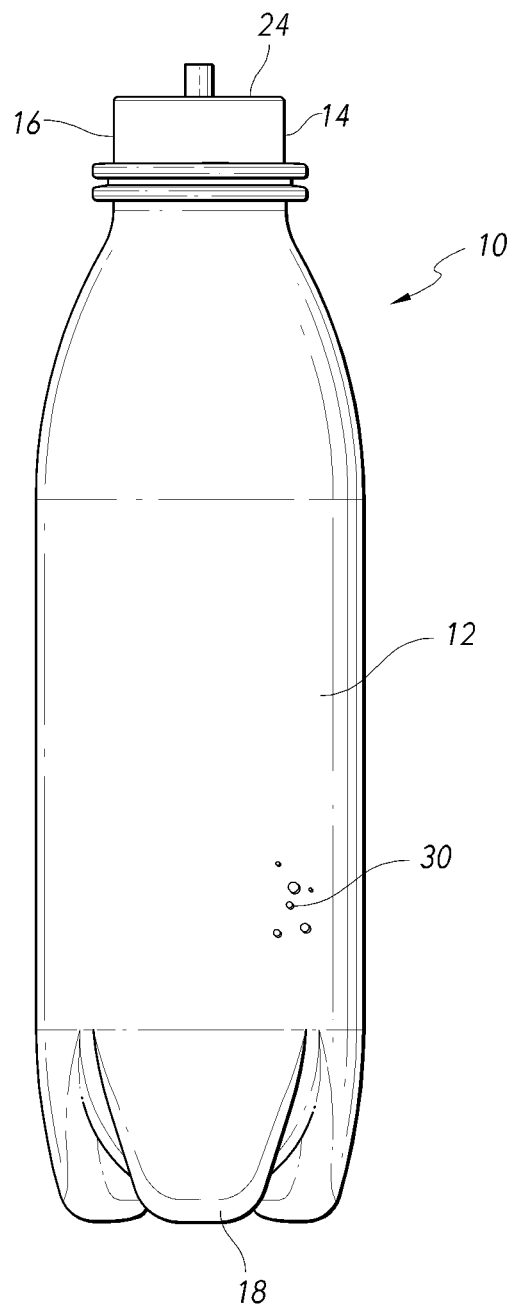
FIG. 1 is a side elevational view of a plastic aerosol container assembly that is constructed according to a preferred embodiment of the invention.

Referring now to the drawings, wherein like reference numerals designate corresponding structure throughout the views, and referring in particular to FIG. 1, a plastic aerosol container assembly 10 that is constructed according to a preferred embodiment of the invention includes a main body portion 12 that defines an interior space in which a pressurized aerosol mixture 30 is preferably provided.

The plastic aerosol container assembly 10 further includes a neck finish portion 14 and a bottom portion 18. Both the finish portion 14 and the bottom portion 18 are preferably unitary with the main body portion 12. The main body portion 12 and the bottom portion 18 are preferably blow molded from a plastic preform using the reheat stretch blow molding process.

The main body portion 12, finish portion 14 and bottom portion 18 are preferably fabricated from a plastic material such as polyethylene terephthalate (PET), polyethylene naphthalate (PEN), acrilonitrile (AN), polycarbonate (PC), polyamide (Nylon), or a blend containing some combination of the same from a plastic preform using a conventional blow molding process such as the reheat stretch blow molding process. In the preferred embodiment, the plastic container is fabricated from a high intrinsic viscosity polyethylene terephthalate material, which most preferably has an intrinsic viscosity that is substantially within a range of about 0.76 to about 0.95.

The main body portion 12 is preferably constructed and arranged to withstand aerosol pressurization within a range of about 50 psig to about 300 psig. More preferably, the main body portion 12 is constructed and arranged to withstand aerosol pressurization within a range of about 120 psig to about 180 psig. The container assembly 10 is preferably pressurized with an aerosol mixture 30 at a range of pressurization that is substantially between about 50 psig to about 300 psig, and more preferably substantially within a range of about 120 psig to about 180 psig.

The aerosol mixture 30 preferably includes a propellant, which could be a liquefied gas propellant or a compressed or soluble gas propellant. Liquefied gas propellants that could be used include hydrocarbon propellants such as propane, isobutene, normal butane, isopentane, normal pentane and dimethyl ether, and hydrofluorocarbon propellants such as difluoroethane (HFC-152a) and tetrafluoroethane (HFC-134a). Compressed and soluble gas propellants that could be used include carbon dioxide ($CO_2$), nitrous oxide ($N_2O$), nitrogen ($N_2$) and compressed air.

Figure 4:
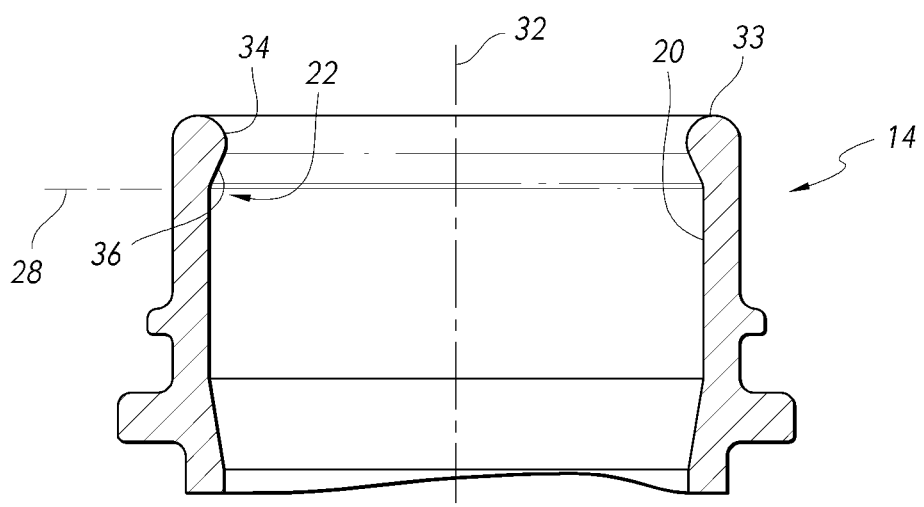
FIG. 4 is a fragmentary cross-sectional view showing a third step in a method that is performed according to the preferred embodiment of the invention.
Figure 6:
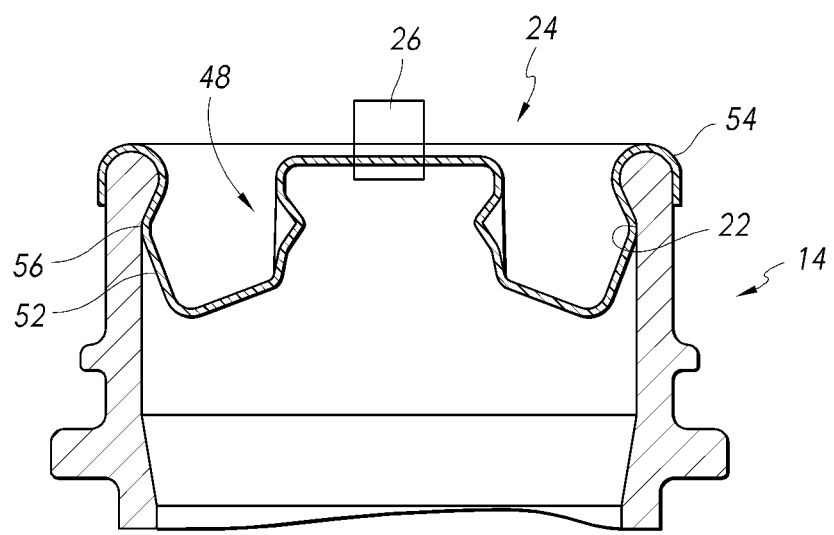
FIG. 6 is a fragmentary cross-sectional view showing a portion of the plastic aerosol container assembly that is depicted in FIG. 1.

The finish portion 14 preferably has an inner surface 20 that has an undercut 22 defined therein, as is best shown in FIG. 4. An aerosol valve assembly 24 is seated against the undercut 22, as is best shown in FIG. 6. Accordingly, the aerosol valve assembly 24 forms an inside seal with respect to the finish portion 14. The aerosol valve assembly 24 in the preferred embodiment is not directly secured to an outer surface of the finish portion 14.

The finish portion 14 has a longitudinal axis 32, and the undercut 22 is preferably oriented within a volume that is equidistant about a transverse plane 28 that is substantially perpendicular to the longitudinal axis 32. In other words, the undercut 22 preferably has a substantially horizontal orientation. This is best shown in FIG. 4. In addition, the undercut 22 preferably extends substantially along an entire inner circumference of the inner surface 20 of the finish portion 14.

Preferably, the plastic material forming the finish portion 14 is crystallized in at least one location within the finish portion 14. The crystallization could be throughout the entire finish portion 14, or in selected portions of the finish portion 14. For example, crystallization could be performed so that substantial crystallization is achieved in at least a first portion of the finish portion 14, substantially no crystallization in a second portion of finish portion 14 and graded crystallization between the first and second portions of the finish portion 14. The term "graded crystallization" refers to a gradual transition between substantial crystallization and substantially no crystallization, as distinguished from a sharp or distinct non-graded pattern of contrast between crystallized and uncrystallized portions of the neck finish. The gradation of crystallization is continuous, and may be either linear or non-linear with distance. Such crystallization in a container neck finish is taught in U.S. Pat. No. 7,033,656 to Nahill et al., the entire disclosure of which is hereby incorporated by reference as if set forth fully herein.

Figure 2:
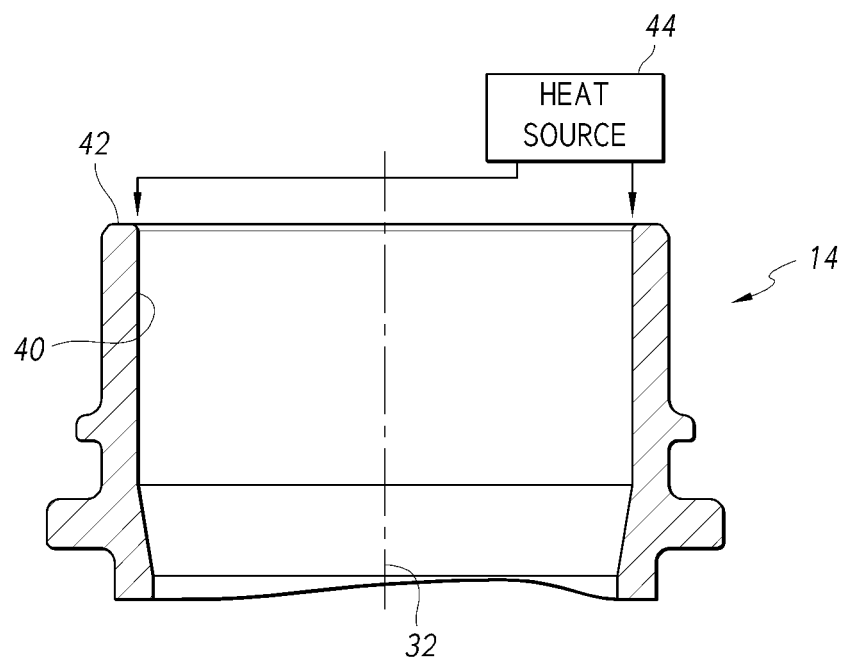
FIG. 2 is a fragmentary cross-sectional view showing a first step in a method that is performed according to the preferred embodiment of the invention.
Figure 3:
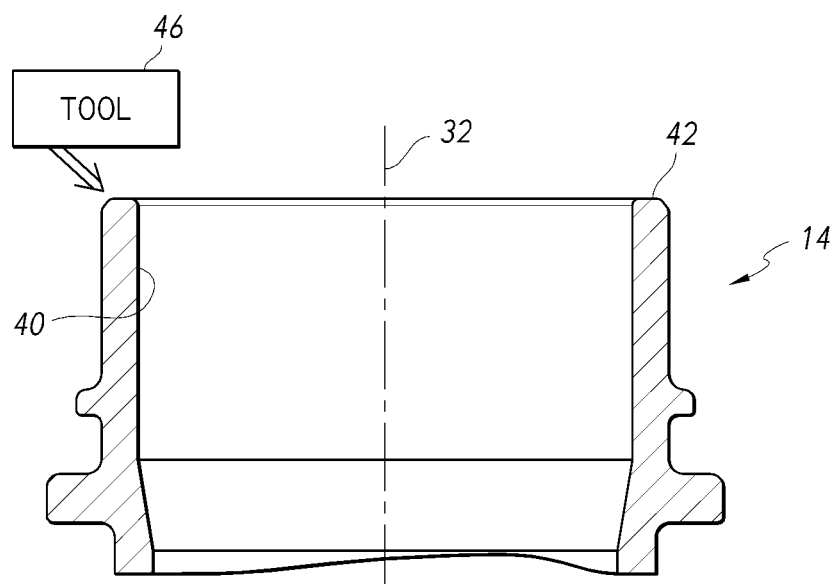
FIG. 3 is a fragmentary cross-sectional view showing a second step in a method that is performed according to the preferred embodiment of the invention.

A method of forming a plastic aerosol container assembly 10 according to a preferred embodiment of the invention is depicted in FIGS. 2-6. Referring to FIG. 2, the finish portion 14 of the container after it has been shaped by the blow molding process typically has an inner surface 40 that is substantially smooth and vertical, with an upper rim 42. Advantageously, the finish portion 14 shown in FIG. 2 is reformed according to the preferred embodiment of the invention so that the inner surface will have the undercut that is shown in FIG. 4.

Heat is preferably applied to the finish portion 14 that is shown in FIG. 2 in order to soften the plastic material. The finish portion 14 is preferably heated to a temperature that is substantially within a range of about 280 degrees F. to about 370 degrees F., and more preferably substantially within a range of about 300 degrees F. to about 350 degrees F. Heating time is preferably substantially within a range of about 20 seconds to about 65 seconds, and more preferably substantially within a range of about 30 seconds to about 55 seconds.

Subsequently, a shaping tool 46 is used to urge the upper rim 42 radially inwardly and downward, so that the upper rim 42 and the inside surface 40 achieve the shape that is depicted in FIG. 4. As FIG. 4 shows, the finish portion 14 at this stage of the process includes an upper rim 33 that transitions to the inner surface 20 so as to define a radially inwardly extending convex lip 34 and a radially outwardly extending concave recess 36 that is positioned immediately beneath the radially inwardly extending convex lip 34.

Figure 5:
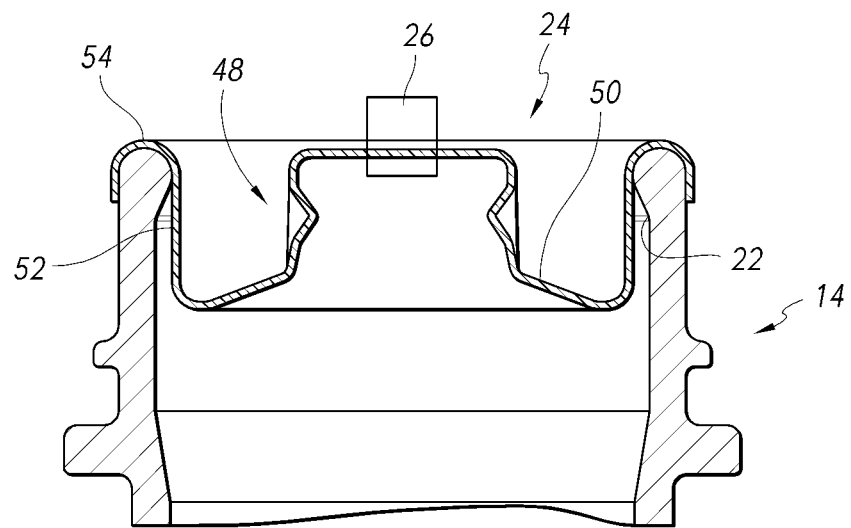
FIG. 5 is a fragmentary cross-sectional view showing a fourth step in a method that is performed according to the preferred embodiment of the invention.

FIG. 5 depicts a blank aerosol valve assembly 24 being inserted into the opening defined by the upper lip 33 of the finish portion 14 that is shown in FIG. 4. The aerosol valve assembly 24 preferably includes a metallic panel 48 to which an aerosol valve stem 26 is mounted. The metallic panel 48 includes an annular downwardly extending portion 50 that includes an outer wall portion 52, which is oriented so as to be substantially straight and vertical, permitting convenient insertion of the blank aerosol valve assembly 24 into the opening. The metallic panel 48 also preferably includes a flange portion 54 that is congruent with and seals against the upper rim 33 and the convex lip 34 of the finish portion 14.

A tool is used to crimp the outer wall portion 52 outwardly into the position that is shown in FIG. 6, in which the inward crimp 56 is seated securely against the undercut 22, firmly securing the aerosol valve assembly 24 against dislodgement from the finish portion 14 as a result of the internal pressurization of the container. Such an inside seal is mechanically preferable to outside seals that have heretofore been used in plastic aerosol container assemblies.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of forming a plastic aerosol container, comprising:
    providing a preform having a finish portion with an inner surface;
    blow molding a plastic container from the preform; and
    reforming the finish portion to include an upper rim that defines a radially-inwardly extending convex lip so that the inner surface has an undercut defined therein proximate the upper rim,
    wherein the undercut has a substantially horizontal orientation and wherein reforming the finish portion is performed after providing a preform.

2. The method of forming a plastic aerosol container according to claim 1, wherein reforming the finish portion is performed after blow molding.

3. The method of forming a plastic aerosol container according to claim 1, wherein the preform having the finish portion is formed by injection molding, and wherein reforming the finish portion is performed by reheating the finish portion and reshaping the finish portion using a mechanical tool.

4. The method of forming a plastic aerosol container according to claim 1, wherein reforming the finish portion is performed by shaping the undercut so that it is oriented within a transverse plane that is substantially perpendicular to a longitudinal axis of the finish portion.

5. The method of forming a plastic aerosol container according to claim 1, wherein reforming the finish portion is performed by shaping the undercut so that the undercut extends substantially along an entire circumference of the inner surface of the finish portion.

6. The method of forming a plastic aerosol container according to claim 1, wherein the preform is fabricated from a material comprising polyethylene terephthalate.

7. The method of forming a plastic aerosol container according to claim 6, wherein material comprising polyethylene terephthalate is crystallized at least one location within the finish portion.

8. The method of forming a plastic aerosol container according to claim 1, further comprising mounting an aerosol valve assembly to the plastic container, the aerosol valve assembly having a portion that engages the inner surface of the finish portion so as to be retained by the undercut.

9. The method of forming a plastic aerosol container according to claim 8, wherein the aerosol valve assembly is seated against the undercut.

10. The method of forming a plastic aerosol container according to claim 8, wherein the aerosol valve assembly is not directly secured to an outer surface of the finish portion.

11. The method of forming a plastic aerosol container according to claim 1, further comprising disposing a pressurized aerosol mixture within the plastic container.

\* \* \* \* \*